Aug. 29, 1961   D. J. EVANS   2,998,211
RUDDER CONTROL SYSTEM FOR AIRCRAFT
Filed June 2, 1959
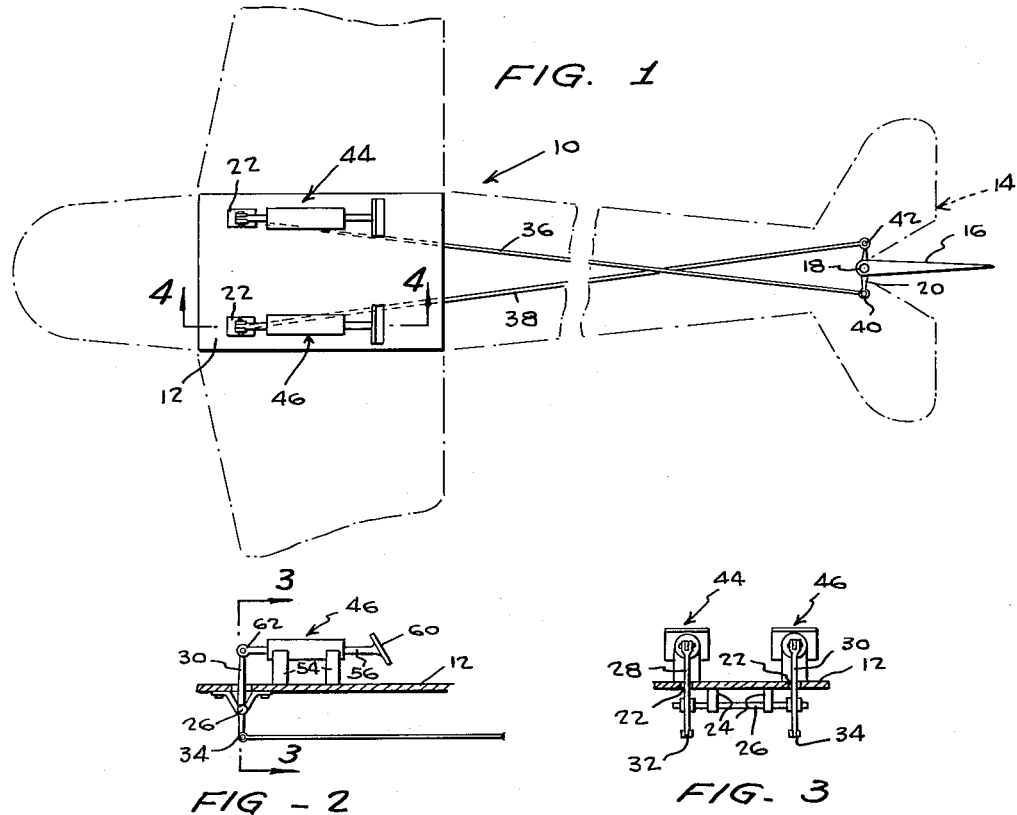
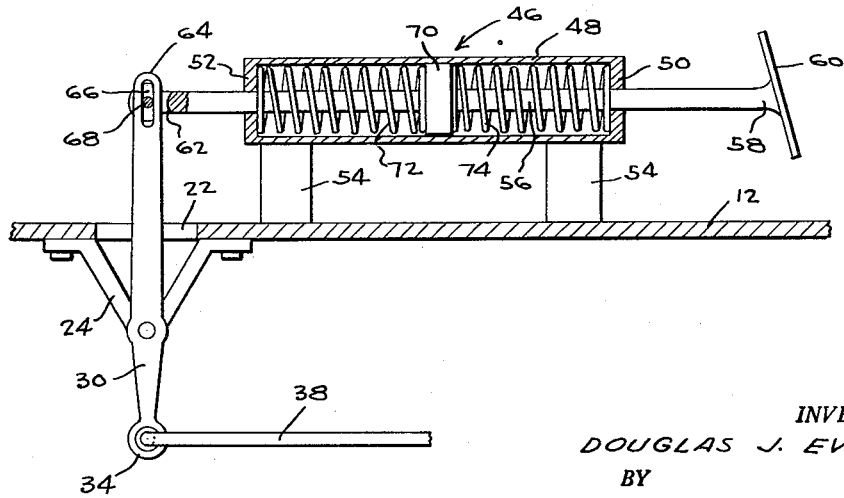
INVENTOR.
DOUGLAS J. EVANS
BY
McMorrow, Berman + Davidson
ATTORNEYS

United States Patent Office 2,998,211
Patented Aug. 29, 1961

2,998,211
RUDDER CONTROL SYSTEM FOR AIRCRAFT
Douglas J. Evans, Bournemouth, England (% Chine Crest, 11 Alum Chine Road, Westbourne, England)
Filed June 2, 1959, Ser. No. 817,579
2 Claims. (Cl. 244—87)

This invention relates generally to aircraft controls and is more particularly concerned with a novel self-centering rudder control system for aircraft.

A primary object of invention is to provide in aircraft a rudder control system comprising a horizontally pivoted rudder incorporating a transversely disposed lever in alignment with the axis of rotation thereof, lever means vertically pivoted on the floor board of a cockpit of an aircraft having a lower end portion thereof engaged with force transmitting means extending to the ends of the first mentioned lever, a pair of force transmitting rods supported in substantially planar alignment with the vertically pivoted lever means pivotally connected thereto at one end, the other end of said rods incorporating foot pedals engageable by a pilot of the aircraft, and centering means engageable with said force transmitting rods for retaining the same in a substantially neutral position.

A still further object of invention in conformance with that set forth is to provide in aircraft a rudder control system which is readily and economically installed, easily used and maintained, highly satisfactory, practical and acceptable for the purpose intended.

These together with other objects and advantages which will subsequently become apparent reside in the details of construction and operation as more fully hereinafter described and claimed, reference being had to the accompanying drawing, forming a part hereof, wherein like numerals refer to like parts throughout, and in which:

FIGURE 1 is a fragmentary plan view of an aircraft incorporating the novel rudder control system;

FIGURE 2 is a side elevational view of a portion of the floor board of the cockpit of the aircraft of FIGURE 1, said floor board being broken away and shown in section;

FIGURE 3 is a fragmentary vertical sectional view taken substantially on line 3—3 of FIGURE 2; and FIGURE 4 is an enlarged fragmentary vertical sectional view taken substantially on line 4—4 of FIGURE 1, portions being broken away and shown in section for clarity.

Referring to the drawing in detail, a fragmentary portion of an aircraft fuselage is indicated generally at 10, said fuselage including the horizontal floor board 12 and incorporating in the tail assembly 14 a horizontally pivotal rudder 16 including a depending shaft portion 18 having extending transversely therefrom an integral lever 20. The heretofore described structure is that conventionally found in aircraft and accordingly further description is unnecessary.

The floor board 12 incorporates a pair of elongated aperture portions 22 therethrough, see FIGURE 3, suitably secured on the undersurface of the floor board in spaced relation are a pair of V-shaped support brackets 24 including aligned transverse aperture portions rotatably supporting therein a support shaft 26. A pair of vertically pivotal levers 28 and 30 are intermediately pivoted on the shaft 26 and suitably secured thereon, said levers extending through one aperture 22. Lower end portions of the levers 28 and 30 are operatively connected by means of suitable connecting means 32 and 34, respectively, to one end of an elongated force transmitting rod or cable or the like indicated at 36 and 38, respectively, opposite ends of said force transmitting means 36 and 38 being operatively connected at 40 and 42, respectively, one of the ends of the lever 20. The force transmitting means 36 and 38 are illustrated as being crossed, however, said force transmitting means may be secured to opposite ends of the lever 20, if desired.

Indicated generally at 44 and 46 are a pair of similar centering means comprising a tubular sleeve member 48 incorporating aligned apertured end walls 50 and 52, see FIGURE 4. The sleeve 48 is suitably supported by means of spaced bracket members 54 from the upper surface of the floor board 12. Reciprocably disposed in the sleeves 48 is a force transmitting rod 56 incorporating on the end 58 normally adjacent a pilot's feet an enlarged foot pedal 60, the other end of which being bifurcated as indicated at 62 and disposed on opposite sides of the upper end 64 of one of the vertically pivotal levers. The vertically pivotal levers incorporate longitudinally extending elongated slots 66 through which a pin element 68 extends, said pin element extending transversely of the bifurcated end 62 of the force transmitting rods. The force transmitting rods 56 incorporate on an intermediate center portion thereof a piston element 70 engageable with the inner periphery of the sleeves 48 providing means for dampening sudden movement of the force transmitting rods. Circumposed on opposite sides of the piston element 70 in the intermediate portion of the force transmitting rods disposed within the sleeve 48 are similar compression springs 72 and 74 opposite ends of which being in engagement with the piston element 70 and an inner surface portion of the apertured end walls 50 and 52 of the sleeve. Compression springs 72 and 74 tend to retain the force transmitting rod, and the rudder operated thereby in a substantially neutral position.

The foregoing is considered as illustrative only of the principles of the invention. Further, since numerous modifications and changes will readily occur to those skilled in the art, it is not described to limit the invention to the exact construction and operation shown and described, and accordingly all suitable modifications and equivalents may be resorted to, falling within the scope of the appended claims.

What is claimed is:

1. In combination, an aircraft having a vertical rudder, a cross lever fixed to the rudder and extending from opposite sides of the rudder, a control assembly mounted on the aircraft and spaced from said rudder, said assembly comprising a pair of laterally spaced control units, each of said units comprising a lever pivotally supported intermediate its ends and having first and second end portions, a stationarily mounted hollow cylinder having closed ends, a piston rod working through the cylinder ends, a piston fixed on the piston rod within the cylinder and spaced from the cylinder ends, said piston rod having first and second ends outside of the cylinder, springs in the cylinder compressed between the ends of the cylinder and related sides of the piston, pin and slot means operatively and severally connecting the first ends of the piston rods to the first end portions of related control unit levers, and rigid connecting rods pivoted to and extending between second end portions of the control unit levers and ends of said cross lever at opposite sides of the rudder, and means on the second ends of the piston rods for operating the pistons in the cylinders.

2. In combination, an aircraft having a vertical rudder, a cross lever fixed to the rudder and extending from opposite sides of the rudder, a control assembly mounted on the aircraft and spaced from said rudder, said assembly comprising a pair of laterally spaced control units, each of said units comprising a lever pivotally supported intermediate its ends and having first and second end portions, a stationarily mounted hollow cylinder having closed ends, a piston rod working through the cylinder ends, a piston fixed on the piston rod within the cylinder and spaced from the cylinder ends, said piston rod having first and second ends outside of the cylinder, springs in the cylinder compressed between the ends of the cylinder and related sides of the piston, pin and slot means operatively and severally connecting the first ends of the piston rods to the first end portions of related control unit levers, and rigid connecting rods pivoted to and extending between the second end portions of the control unit levers and ends of the cross lever at opposite sides of the rudder, and foot pedals on the second ends of the piston rods for operating the pistons in the cylinders, said connecting rods being crossed intermediate their ends.

References Cited in the file of this patent

UNITED STATES PATENTS

| | | |
|---|---|---|
| 1,844,607 | Sikorsky | Feb. 9, 1932 |
| 2,005,061 | Thomas | June 18, 1935 |
| 2,638,289 | McKellar et al. | May 12, 1953 |
| 2,694,536 | Feeney | Nov. 16, 1954 |

OTHER REFERENCES

Ingenious Mechanisms for Designers and Inventors. Published by The Industrial Press (London), 1936, page 375 relied upon.